(12) United States Patent
Scarborough

(10) Patent No.: US 7,896,377 B2
(45) Date of Patent: Mar. 1, 2011

(54) LEVER ENHANCED PEDALING SYSTEM WITH MULTI-SPEED CONTROL SYSTEM

(75) Inventor: Rashad Na'im Scarborough, Durham, NC (US)

(73) Assignee: Rashad Na'im Scarborough, Durham, NC (US)

( * ) Notice: Subject to any disclaimer, the term of this patent is extended or adjusted under 35 U.S.C. 154(b) by 529 days.

(21) Appl. No.: 11/881,764

(22) Filed: Jul. 30, 2007

(65) Prior Publication Data

US 2008/0054589 A1 Mar. 6, 2008

Related U.S. Application Data

(60) Provisional application No. 60/841,051, filed on Aug. 29, 2006.

(51) Int. Cl.
*B62M 1/04* (2006.01)
*B62K 3/10* (2006.01)

(52) U.S. Cl. ............... 280/254; 280/253; 280/258; 74/131; 74/134; 74/502.2

(58) Field of Classification Search ............... 280/254, 280/253, 255, 256, 257, 258
See application file for complete search history.

(56) References Cited

U.S. PATENT DOCUMENTS

| | | | | |
|---|---|---|---|---|
| 290,576 A * | 12/1883 | Hambly | ............ | 280/254 |
| 354,337 A * | 12/1886 | Mercer | ............ | 280/258 |
| 416,016 A * | 11/1889 | Schrader | ............ | 74/134 |
| 593,101 A * | 11/1897 | Myer | ............ | 74/134 |
| 627,199 A * | 6/1899 | McDonnell et al. | ............ | 280/254 |
| 1,148,419 A * | 7/1915 | White | ............ | 280/254 |
| 2,831,703 A * | 4/1958 | Shrimpton | ............ | 280/254 |
| 3,414,293 A * | 12/1968 | Frye | ............ | 280/254 |
| 3,834,733 A * | 9/1974 | Harris | ............ | 280/251 |
| 3,954,282 A * | 5/1976 | Hege | ............ | 280/251 |
| 4,227,712 A * | 10/1980 | Dick | ............ | 280/236 |
| 4,272,096 A * | 6/1981 | Efros | ............ | 280/255 |
| 4,300,784 A * | 11/1981 | Efros | ............ | 280/255 |
| 4,574,649 A * | 3/1986 | Seol | ............ | 74/138 |
| 4,666,173 A * | 5/1987 | Graham | ............ | 280/255 |
| 5,335,927 A * | 8/1994 | Islas | ............ | 280/255 |
| 5,716,069 A * | 2/1998 | Bezerra et al. | ............ | 280/254 |
| 5,876,052 A * | 3/1999 | Olson et al. | ............ | 280/244 |
| 5,988,662 A * | 11/1999 | Staehlin | ............ | 280/253 |
| 2004/0262878 A1* | 12/2004 | Scarborough | ............ | 280/253 |

* cited by examiner

*Primary Examiner*—Lesley Morris
*Assistant Examiner*—Wesley Potter

(57) ABSTRACT

A multi-speed system configured to increase the speed or decrease the pedaling effort of a lever propelled bicycle. The multi-speed system is composed of a manual control device 70, mounted on the frame close to the rider's hand placement on the handle bars, and other connected components configured to change wheel rotation per pedal. It has the ability to transfer manual force to the transmission means to change propulsion speed and effort. Depressing a control lever 2 down will allow the rider to increase in speed and lifting the control lever 2 up would allow the rider to decrease pedaling effort.

1 Claim, 16 Drawing Sheets

LEVER ENHANCED PEDALING SYSTEM WITH MULTI-SPEED CONTROL SYSTEM

This document is a Continuation-In-Part of U.S. provisional application Ser. No. 60/841,051, filed on Aug. 29, 2006, and claims priority thereto under 35 U.S.C. 119(e).

BACKGROUND OF THE INVENTION

1. Field of the Invention

This invention relates to multi-speed systems integrated into bicycles for enhancing propulsion performance.

2. Description of the Related Art

A great multitude of bicycles manufacturers produce bikes having multi-speed systems that allow a rider to change gears to increase speed and decrease pedaling effort when experiencing pedaling resistance. These multi-speed systems are ergonomically accessible to the rider and very convenient.

The standard or most common multi-speed systems used on bicycles are mechanical configurations that allow the rider to manually derail the chain from one sprocket so that it may catch on and completely engage another. Although these systems have improved over time, because of their mechanical nature they present various problems to the rider.

Bicycles with derailleur systems have the potential to skip gears when being manually shifted from one gear to the intended gear. They also have the potential to acquire resistance to shifting from one sprocket to another sprocket, resulting in stiff gear changing levers or handles.

Front derailleur systems have the potential possibility to cause damage to the rider's clothing. Since the crank sprockets must be between the wheels of conventional bicycles so that the rider's feet may rotate them, this close proximity of the crank sprocket to the rider's feet leaves the rider's lower pant edge or a woman's dress edge open to being snatched in between the chain and crank sprocket. Such scenarios may result in the rider's clothes being torn or irremovable oil stains smeared on the riders clothing. Other problems related to derailleur systems include the following:

(a) chain derailing that is not smooth;

(b) a chain removed from a sprocket that does not catch on to another sprocket, resulting in the unlinking of transmission power to the rear wheel; and (c) the chain skipping sprocket teeth while pedaling.

An example of such a derailleur system can be illustrated in U.S. Patent application Pub. No. US 2006/0194660 by Satoshi Shahana. Other multi-speed systems use lever machines exploiting the mechanical advantages of the lever by locating the transmission drive mechanism close to the fulcrum, while the applied force to the load is farther away from the fulcrum. An example of a lever powered bicycle is illustrated in (U.S. Pat. No. 4,666,173 to Garnard E. Graham. The invention has multiple mechanical configurations for a multi-speed system applied to the lever powered bicycle. Besides having the problems related to derailleur systems as stated before, this invention using a derailleur (FIG. 5) to change the sprocket ratio to increase speed or decrease effort, does not have a clear manually controlled means for changing the chain from one sprocket to the other. According to FIG. 1 (U.S. Pat. No. 4,666,173) there is the disadvantage of not being able to increase rear wheel revolutions per pedal. For example, if the bike increased in speed due to gravity pull on the bike while moving downhill, the rider would have to pedal faster when the bracket is farthest away from the fulcrum in order to increase the speed of the bike. The Lever Enhanced Pedaling System (LEPS) with multi-speed system can provide more revolutions per pedal when the carriage is farthest away from the fulcrum and add more torque to speed without changing the pedaling range or increasing the pedaling rate to keep up with the increase in wheel revolutions. In FIG. 6 (U.S. Pat. No. 4,666,173) wheel revolutions per pedal is increased as the linear chain connected to the bracket is moved farther away from the fulcrum, but this lacks more range than a curved linear transmission means provided by the LEPS with multi-speed system. This is because the circumference of a curve has more surface length than a straight line.

In U.S. Pat. No. 5,988,662 awarded to John Staehlin, the invention has its multi-speed changing mechanism integrated into its pedal assembly. Although this apparatus has similarities to the LEPS, there is no clear mechanical means of moving both propulsion loads or slide blocks (52) closer or away from the fulcrum simultaneously with precision. The LEPS has manual handles on opposite sides of the frame close to the handle bars, which would allow the rider to pull up the multi-speed handle in order to move the propulsion loads or carriages of both lever machines closer to the fulcrum simultaneously, with slip lock motion in that direction and vice versa, in the in the opposite direction, when the multi-speed handle is pulled downwards. Furthermore, the "L" shaped lever offers more mechanical advantage than curved shaped lever of this apparatus because its length is beyond the axle of the rear wheel, thus spreading pedaling effort along a longer distance.

In U.S. Pat. No. 5,335,927 awarded to Islas, the multi-speed system in FIG. 2 has duplicate anchors with the ability to be moved within separate slots having upper rounded notches to hold the anchor in place. The anchor pulls the chain when the pedal is depressed. However, there is no clear means to manually change the anchor from one notch to another while a rider is pedaling the bike. Ergonomically, the multi-speed system of the LEPS has a manual speed changing apparatus close in proximity to the rider's hands. Furthermore, the slot FIG. 2 (U.S. Pat. No. 5,335,927) where change in mechanical advantage is to occur is further away from the fulcrum in distance relative to the area of applied force or pedals. Thus, the advantages of this lever machine are not being fully exploited, because the mechanisms that changes wheel revolutions per pedal are not positioned close to the fulcrums.

BRIEF SUMMARY OF THE INVENTION

Objects and Advantages

Decidedly, besides the conveniences and advantages of the multi-speed system for the LEPS, various benefits of the present invention are:

(a) to provide a multi-speed system with less pedaling effort to propel the rider due to the propulsion load being spread along a longer distance throughout the length of the lever;

(b) to provide a multi-speed system with a rear wheel that is easy to be removed from the frame and spur gear assembly; and (c) to provide a multi-speed system that is free from being derailed while changing both carriages' proximity to their fulcrums to achieve mechanical advantage.

Further objects and advantages are to provide a multi-speed system with a curved linear transmission means possessing a pull rate in distance pulled per wheel revolution that is greater than a chain fastened to a lever being pulled the same distance. Even more objects and advantages will become evident by the examination of the following description and drawings.

As detailed in the present application the multi-speed system for the LEPS is an invention that allows the rider to increase its speed while it is moving or to decrease the effort in pedaling by vertically moving the propulsion load near to or away from its fulcrums.

REFERENCE NUMERALS IN THE DRAWINGS

| | |
|---|---|
| 2 | control lever |
| 4 | reel disk |
| 6 | cable routing system pulley wheels |
| 8 | multi-speed cable |
| 10 | carriage |
| 12 | carriage wheels |
| 16 | rail groove |
| 18 | frontal spring |
| 20 | inner arm |
| 22 | reel teeth |
| 24 | outer arm |
| 26 | rear spring |
| 28 | stationary peg |
| 30 | outer fulcrum |
| 32 | pivotal peg |
| 34 | inner fulcrum |
| 36 | handle axle |
| 40 | reel surface |
| 42 | rear spring peg |
| 44 | front spring peg |
| 46 | curved linear gear |
| 48 | right angle fulcrum |
| 49 | right angle router |
| 52 | binder pulley wheels |
| 54 | spur gear |
| 56 | front gear binder |
| 58 | seat post cylinder |
| 60 | fulcrum |
| 62 | axle |
| 64 | frame |
| 66 | lock angle |
| 68 | push angle |
| 70 | multi-speed control system |
| 72 | brake line |
| 74 | lever machine |
| 76 | reverse lever |
| 78 | reverse lever fulcrum |
| 80 | reverse cable |
| 82 | reverse pulley wheel |
| 84 | right angle lever |
| 86 | extended hub assembly |
| 88 | triangular units |
| 90 | movable cylinder |
| 92 | stationary cylinder |
| 94 | right angle spring |
| 96 | compression spring |
| 98 | outer hub |
| 100 | inner hub |
| 102 | axle bearing |
| 104 | lever plates |
| 106 | bracing edge |
| 108 | freestyle sprocket |
| 110 | outer sprocket |
| 112 | inner sprocket |
| 114 | reverse routing system |
| 116 | axle nut |
| 118 | reciprocal cable |
| 120 | reciprocal pulley wheels |
| 122 | rear wheel hub |

DETAILED DESCRIPTION

Figure 7:
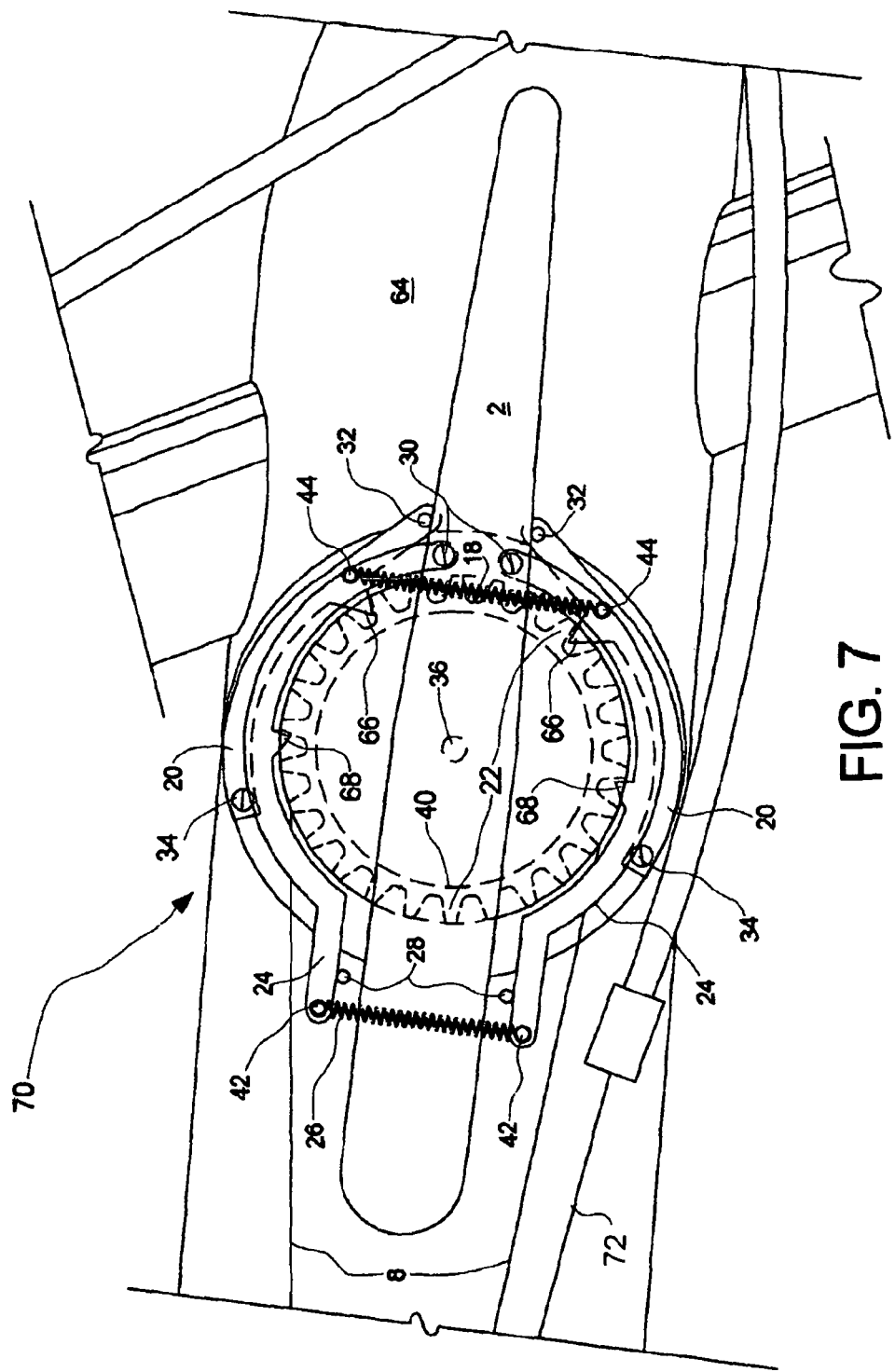
FIG. 7 shows an enlarged section of the multi-speed controls 70 with hidden components exposed.

All the following descriptions define what is illustrated in the drawings provided and how it works. A preferred embodiment of the multi-speed system for the LEPS is illustrated in FIGS. 1 to 8 and 15. FIG. 7 shows an exposed view of the manual control mechanism. The control lever 2 should be composed of a strong metallic material, preferably steel or titanium, and ⅛" in thickness. The frontal portion is narrow and increases in width angularly as it gets closer to its fulcrum 36 while the edges after the fulcrum 36 are parallel. The end portion is rounded off 1.22" after the rear spring 26. A duplicate control lever 2 is on the opposite side of the frame 64 (FIG. 8) and both control levers 2 are welded to their reel disks 4 centrally. Each reel disk 4 is welded centrally to the same axle 36. So when one control lever 2 is lifted up, the other is simultaneously lifted up.

Each reel disk 4 is circular with a bore through its center. Each disk 4 has an extended edge extending forward about ¾" from its frontal curve. These extended edges are formed to offset the inner pivotal connection between each disk 4 and its pair of outer arms 24. Each pair of outer arms 24 is connected to its reel disk 4 by fasteners 30. Each outer arm 24 is curved from the front towards the rear, and then stops to form a straight edge rearward. The outer arms are ¼" in width and ⅛" in thickness. The ends of the outer arms are rounded off with a bore through the center of each radius. Each frontal bore accommodates a small fastener 30. Each bore through the rear end surface of the symmetrical arms 24 accommodates a peg 42 that is fuse welded in place. One end of an extension spring 26 is attached to an upper peg 42 and the other end is attached to a lower peg 42. Each arm 24 has a triangular protrusion 68 from its inner curve. The front edge of the angle 68 is steeper than the rear facing edge. The front edge is formed to lock the reel teeth 22 (FIGS. 7-8) in place and keep the multi-speed cable 8 restricted in movement. It is also formed to push the reel teeth 22 forward clockwise or counter clockwise.

Figure 8:
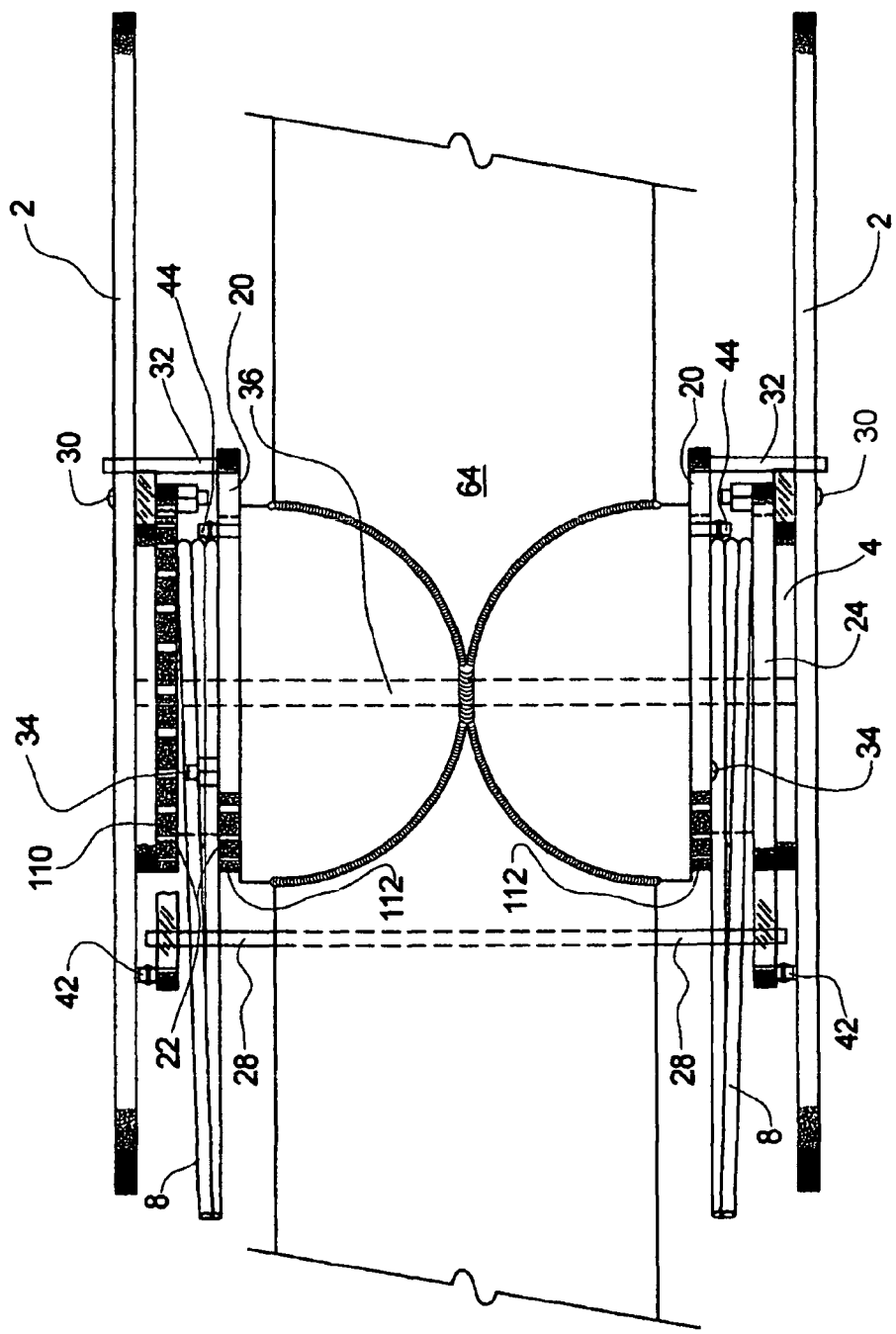
FIG. 8 shows an enlarged top view section of the multi-speed controls 70.
Figure 9:
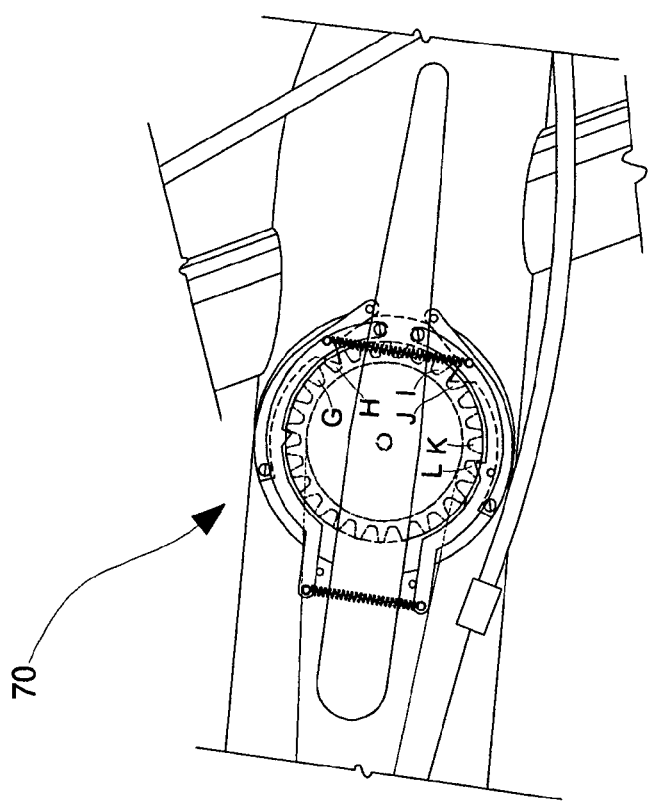
FIG. 9 shows the exposed teeth of the multi-speed controls 70 and the identification of significant notches that are related to moving the carriage 10 away from the fulcrum 36.
Figure 9A:
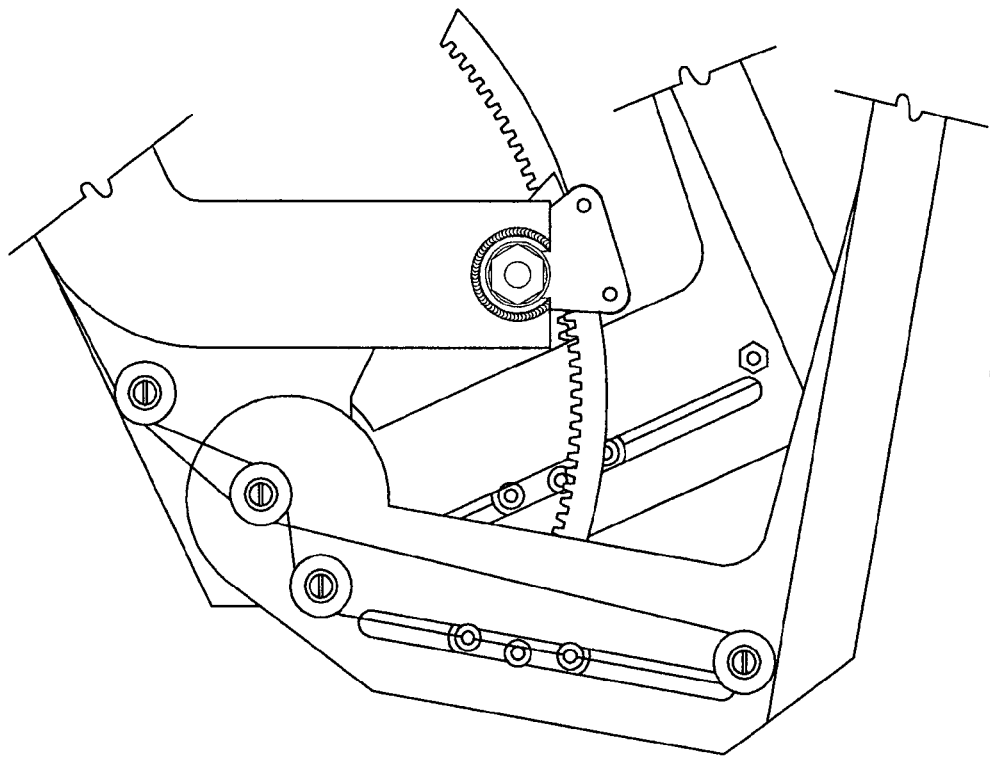
FIG. 9A shows a right section of the carriages 10 before they are moved away from their fulcrums 60.
Figure 10:
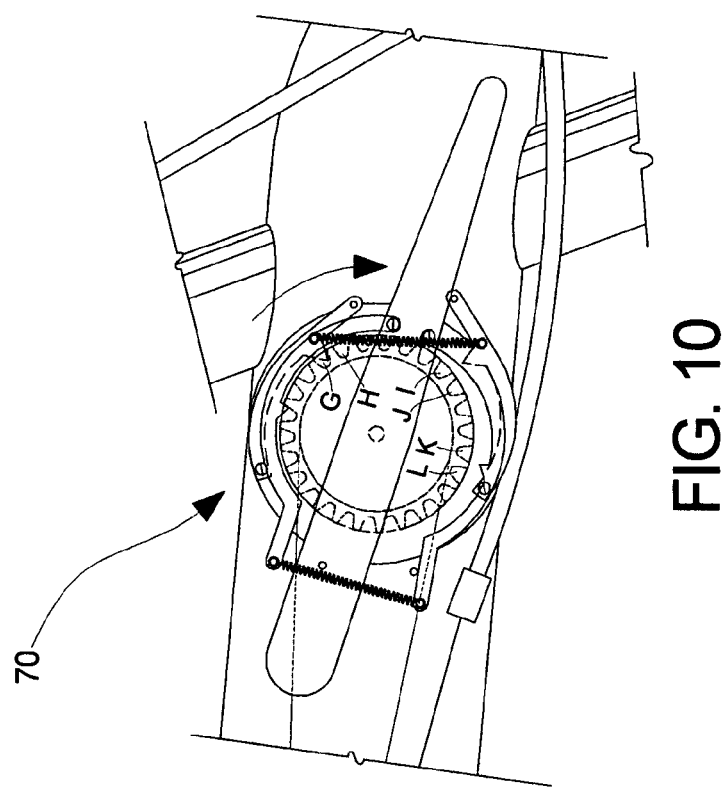
FIGS. 10 and 10A show how the speed control arms (20 & 24) and carriages 10 react when the speed control lever 2 is pivoted downward. It also shows the displacement of identified notches relative to the triangular protrusions of the speed control arms.
Figure 10A:
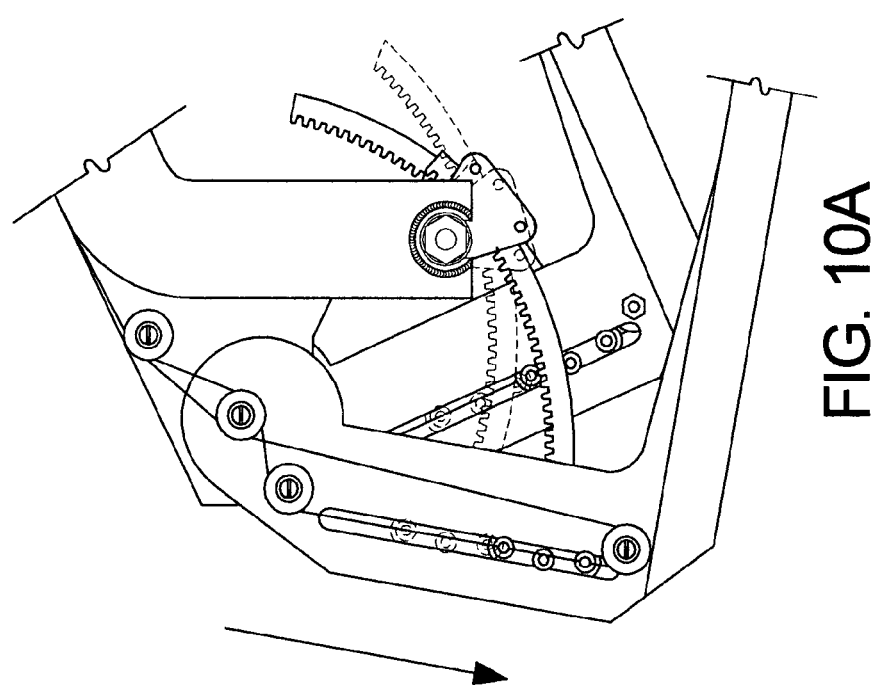
Figure 11:
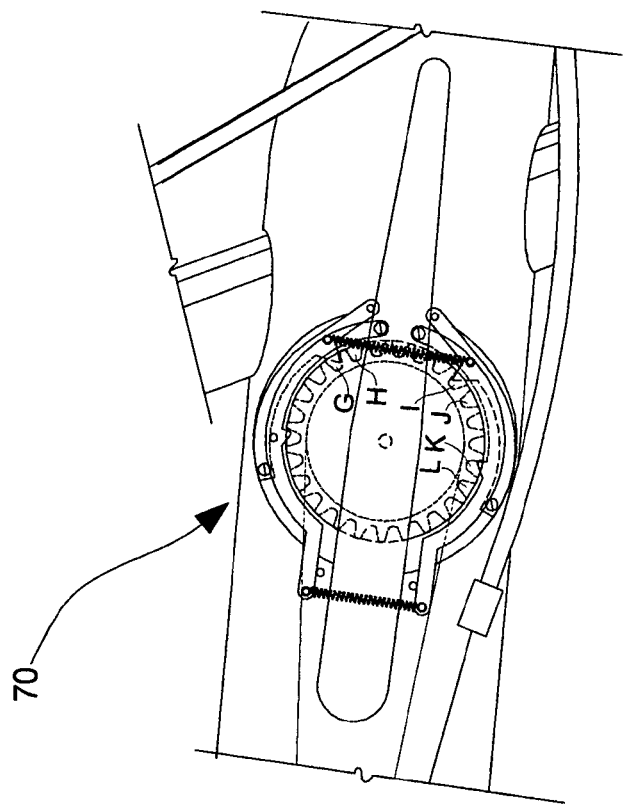
FIGS. 11 and 11A show how the speed control lever 2 is returned back to its former position after being pivoted downward and the displacement of the identified notches relative to the triangular protrusions (66 & 68) of the speed control arms (20 & 24).
Figure 11A:
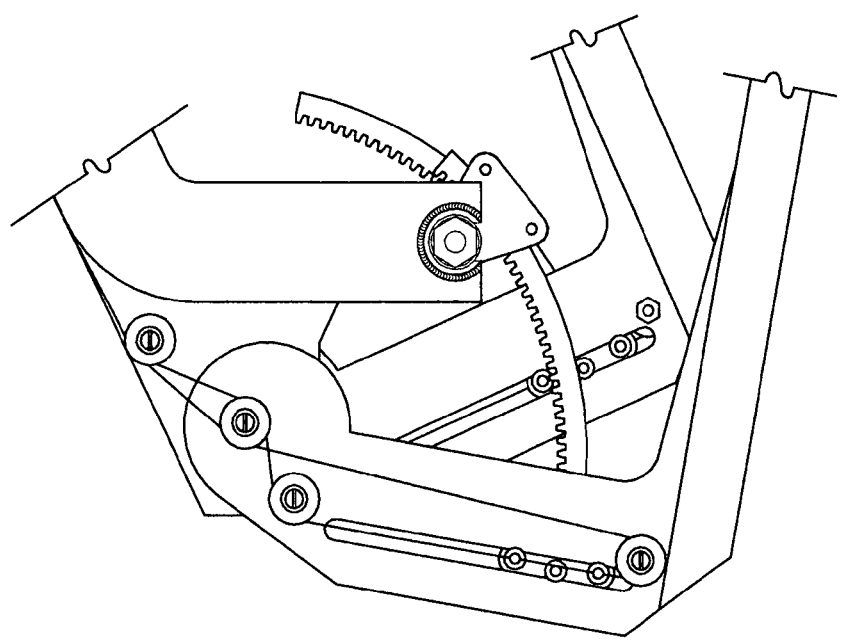
Figure 12:
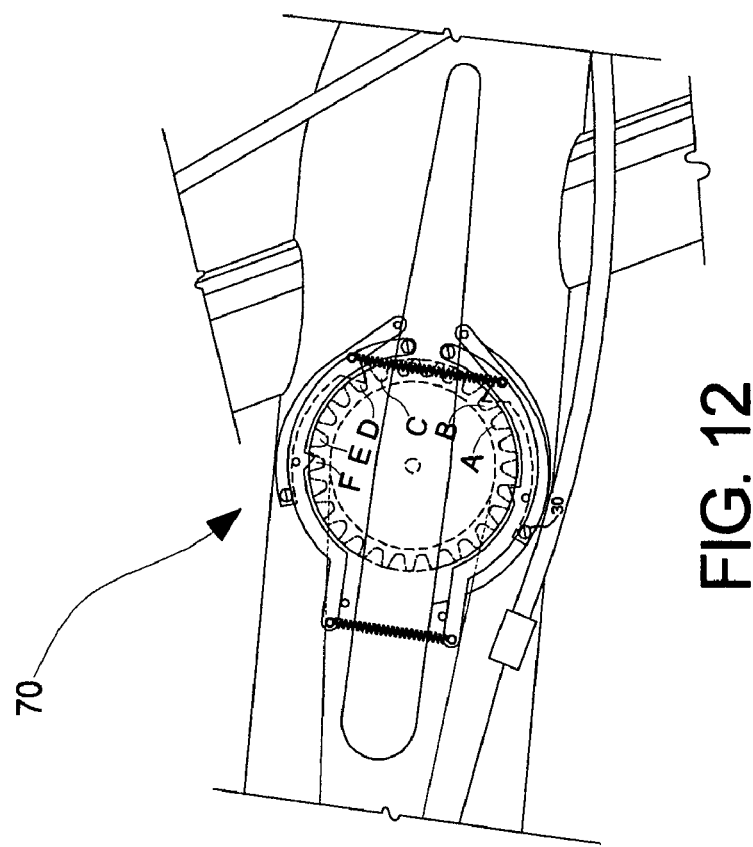
FIG. 12 shows the exposed teeth of the multi-speed controls 70 and the identification of significant notches that are related to moving the carriage towards the fulcrum 60.
Figure 12A:
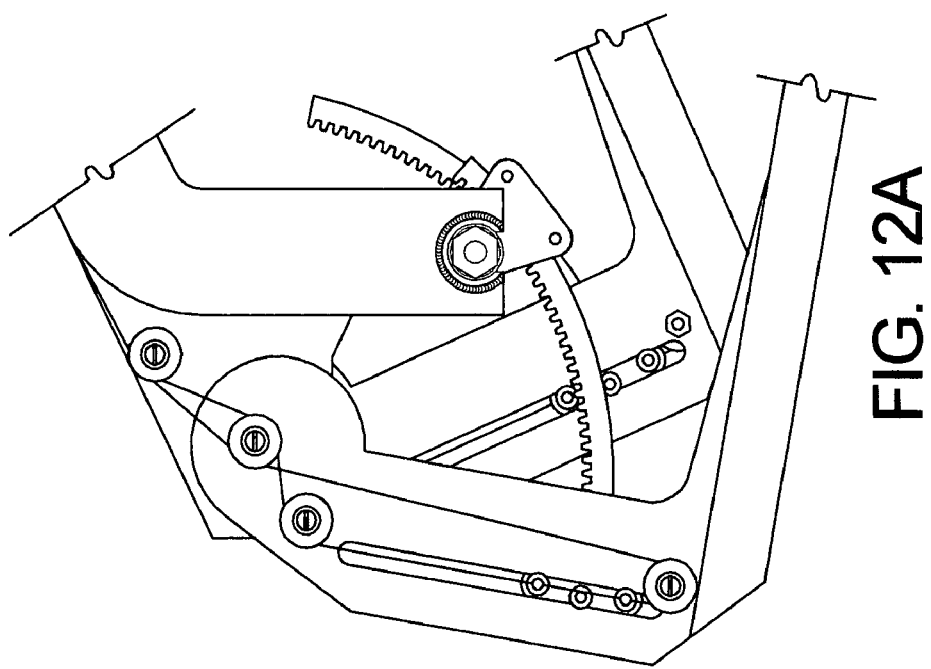
FIG. 12A shows a right section of the carriage 10 before it is moved towards the fulcrum 60.
Figure 13:
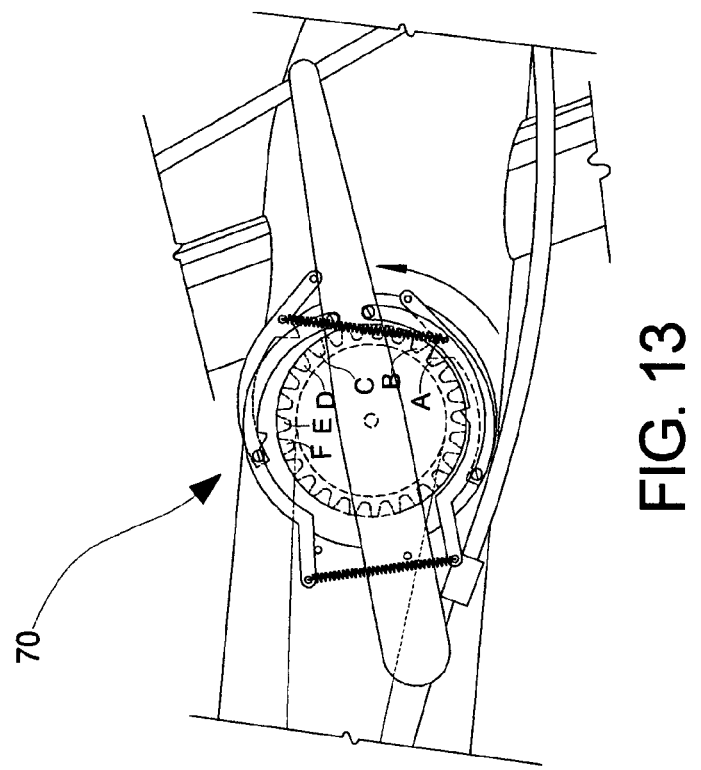
FIGS. 13 and 13A show how the speed control arms (20 & 24) and carriages react when the speed control lever 2 is pivoted upwards. It also shows the displacement of identified notches relative to the triangular protrusions (66 & 68) of the speed control arms (20 & 24).
Figure 13A:
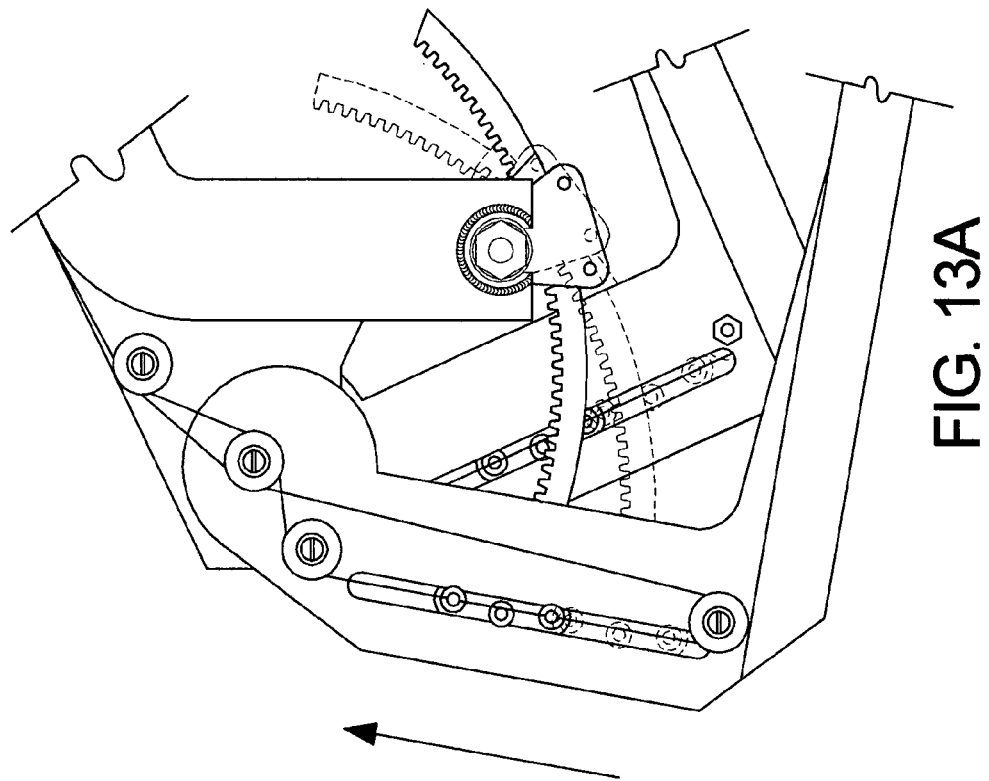
Figure 14:
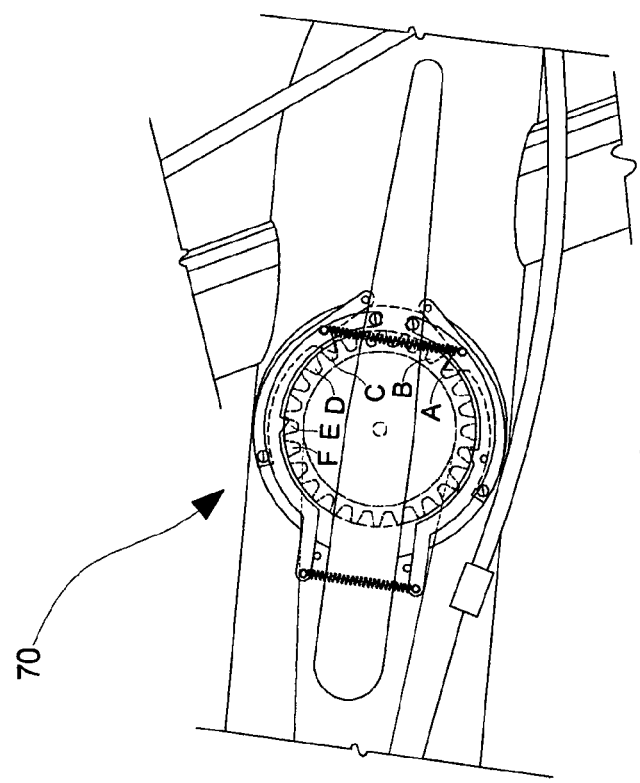
FIGS. 14 and 14A show how the speed control lever 2 is returned back to its former position after being pivoted upwards and the displacement of the identified notches relative to the triangular protrusions (66 & 68) of the speed control arms (20 & 24).
Figure 14A:
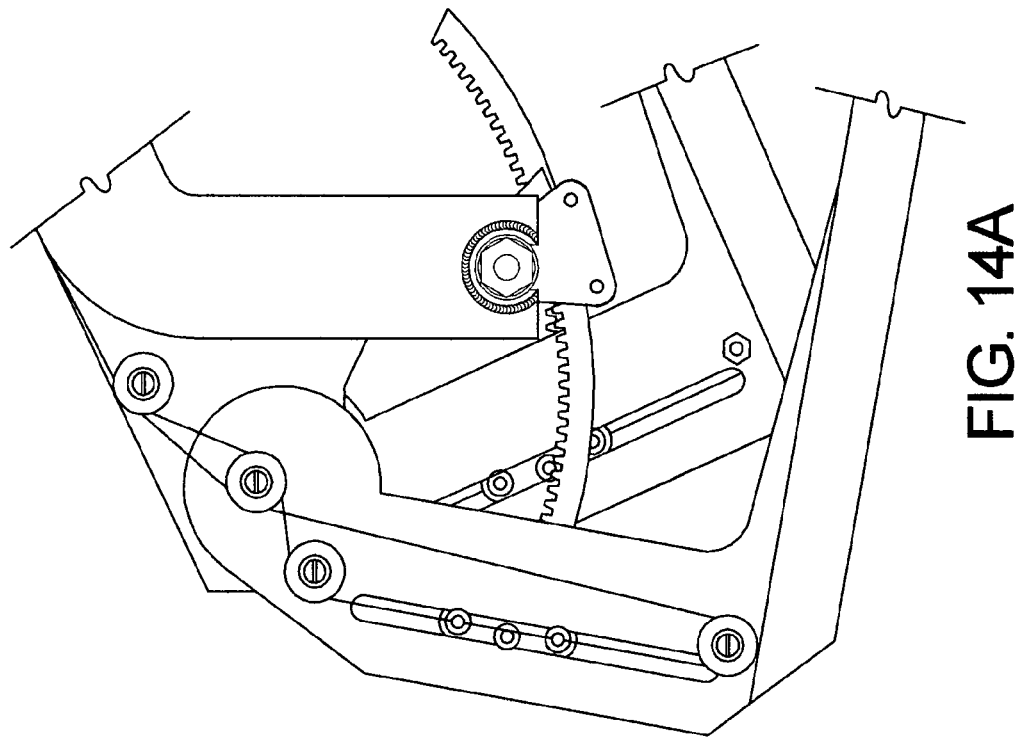

The sprockets 110 adjacent to each reel disk 4 have the ability to rotate on the axle 36 in any direction. The sprocket 110 is welded to its reel's 40 surface and the reel is composed of a circular ¼" thick plate with an array of bores in it for lessening its weight. Two other sprockets 112 are welded to the opposite sides of each reel 40. These sprockets 112 are adjacent to the frame 64 of the bike and have teeth 22 that are aligned to the sprockets 110 adjacent to each reel disk 4. The inner arms 20 of the manual multi-speed controls 70 are in symmetric pairs on opposite sides of the frame 64. The upper arm 20 is curved with a width of ¼" and a thickness of ⅛". The arm 20 has a bore through its rear surface, which accommodates a fastener 34. This fastener holds the arm 20 to the frame 64 pivotally. The inner curve of the arm 20 has a protruding angle 66 with the front facing edge steeper than the rear facing edge. Its frontal end is rounded with a second bore near the center of its radius. A peg 32 occupies this bore and is fused welded in place. A duplicate inner curved arm 20 is below the reel 40, which is the second of the pair of symmetrical arms 20. Each angular protrusion 66 from the inner curves of these arms 20 are formed to prevent the inner sprockets 112 from rotating along with the control lever 2 after a sprocket tooth 22 has been is pushed forward with the push angle 68 from an outer arm 24. A third bore near the lock angle 66 is through the surface of the inner arm 20 accommodating a peg 44, which extends outwards (FIG. 8). The peg 44 is connected to one end of an extension spring 18 while the other end of the spring 18 is connected to a duplicate peg 44 of a duplicate arm 20 positioned under the axle 36 of the manual control system 70. Each frontal peg 32 is positioned to be pushed by the control lever 2 to disengage a lock angle 66 from a reel tooth 22.

The multi-speed cable 8 is composed of steel. It is fastened to a frontal portion of the reel 40 surface. From this point the cable 8 is wrapped around the reel 40 surfaces in opposite directions clockwise and counter clockwise at least two times. Two lines of the cable 8 then lead back towards the rear of the bike and are routed by a system of mounted pulley wheels 6. The first pulley wheel 6 on the right side of the frame 64 is shared between the multi-speed cable 8 and the brake line 72. A configuration of seven pulley wheels 6 mounted on the right side of the bike leads its multi-speed cable 8 in a linked path back towards the carriage 10, which loops around the pulley wheel 6 near the base of the lever 74, then back to the reel 40 surface where it is fastened in place. A duplicate configuration of seven pulley wheels 6, multi-speed control system 70 and multi-speed cable 8 assembly is mounted on the left side of the frame 64.

Figure 1:
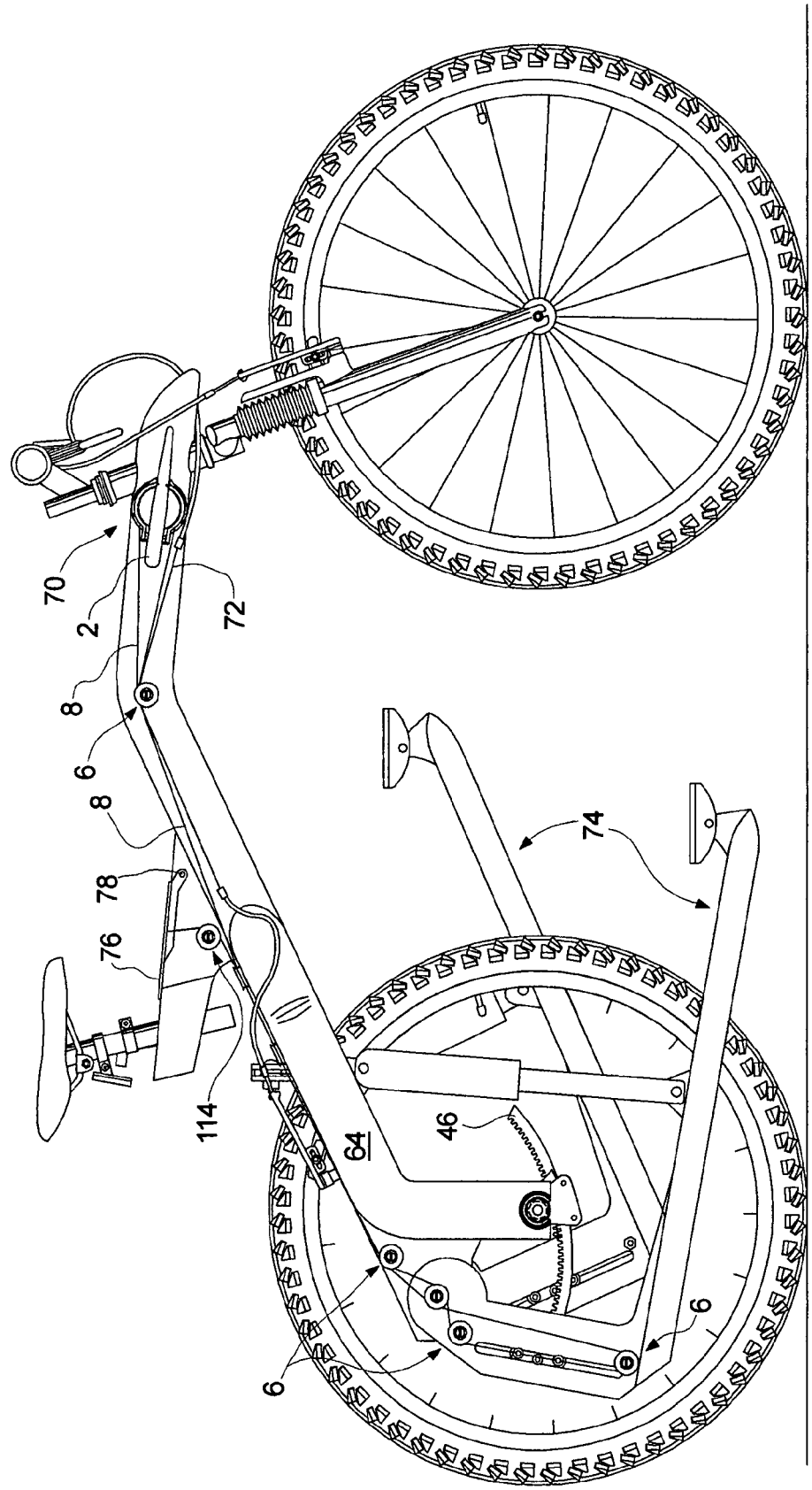
FIG. 1 shows a right side view of the Lever Enhanced Pedaling System (LEPS) and how the multi-speed system is applied to it.
Figure 2:
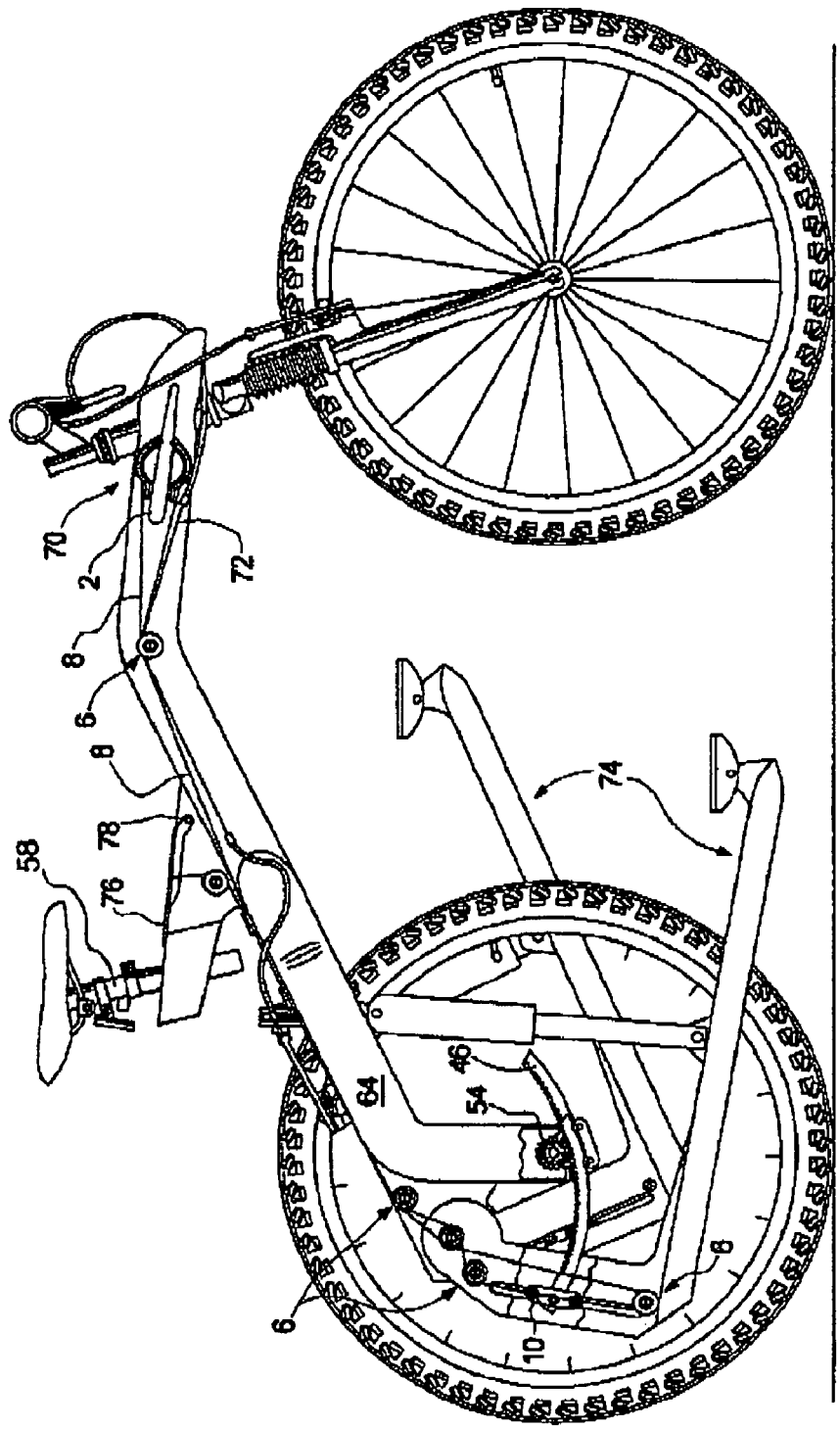
FIG. 2 shows a right side view of the LEPS with multi-speed system having cut away sections exposing how the system works with relation to other components.
Figure 3:
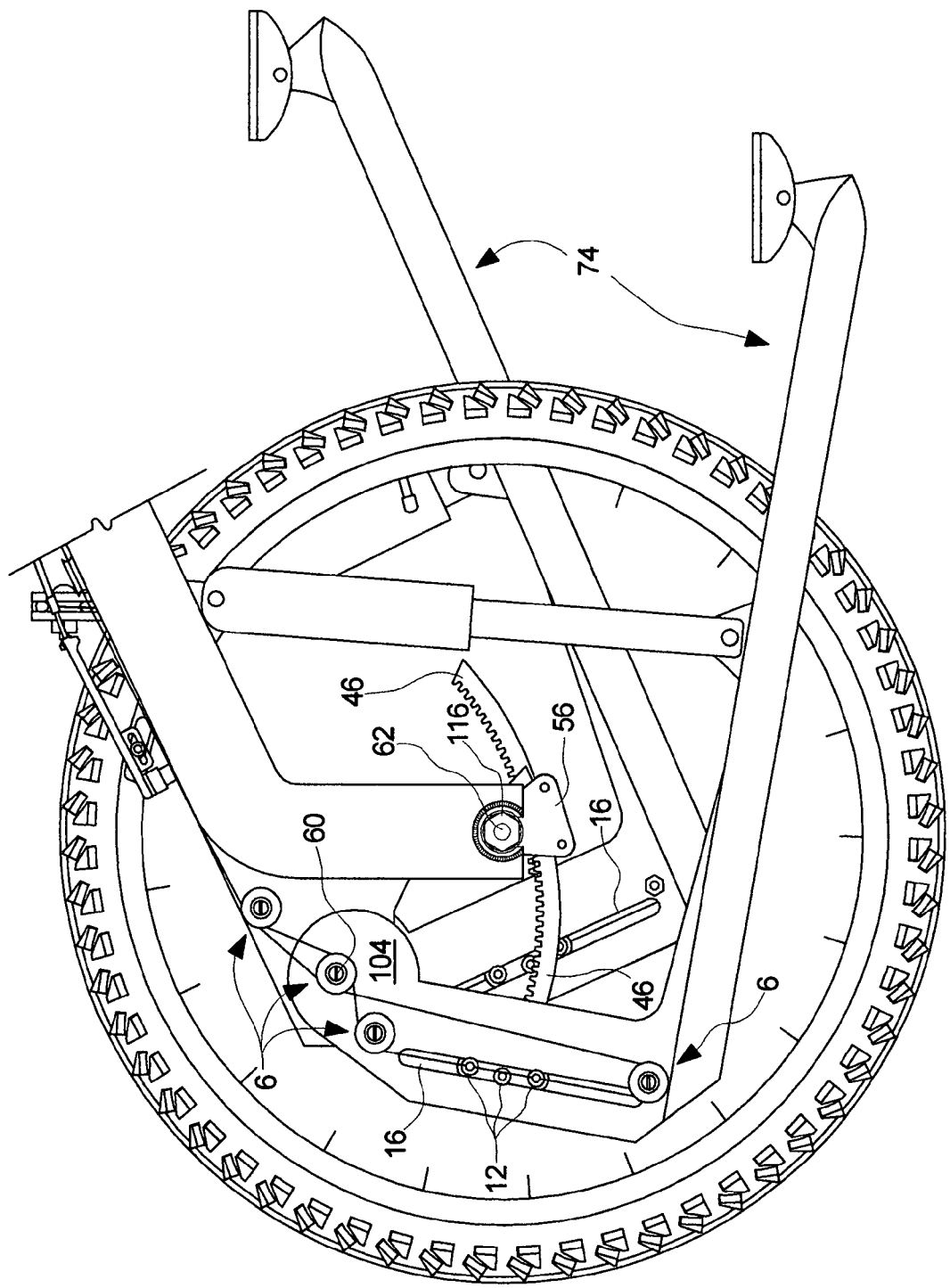
FIG. 3 shows an enlarged section of the multi-speed system.
Figure 4:
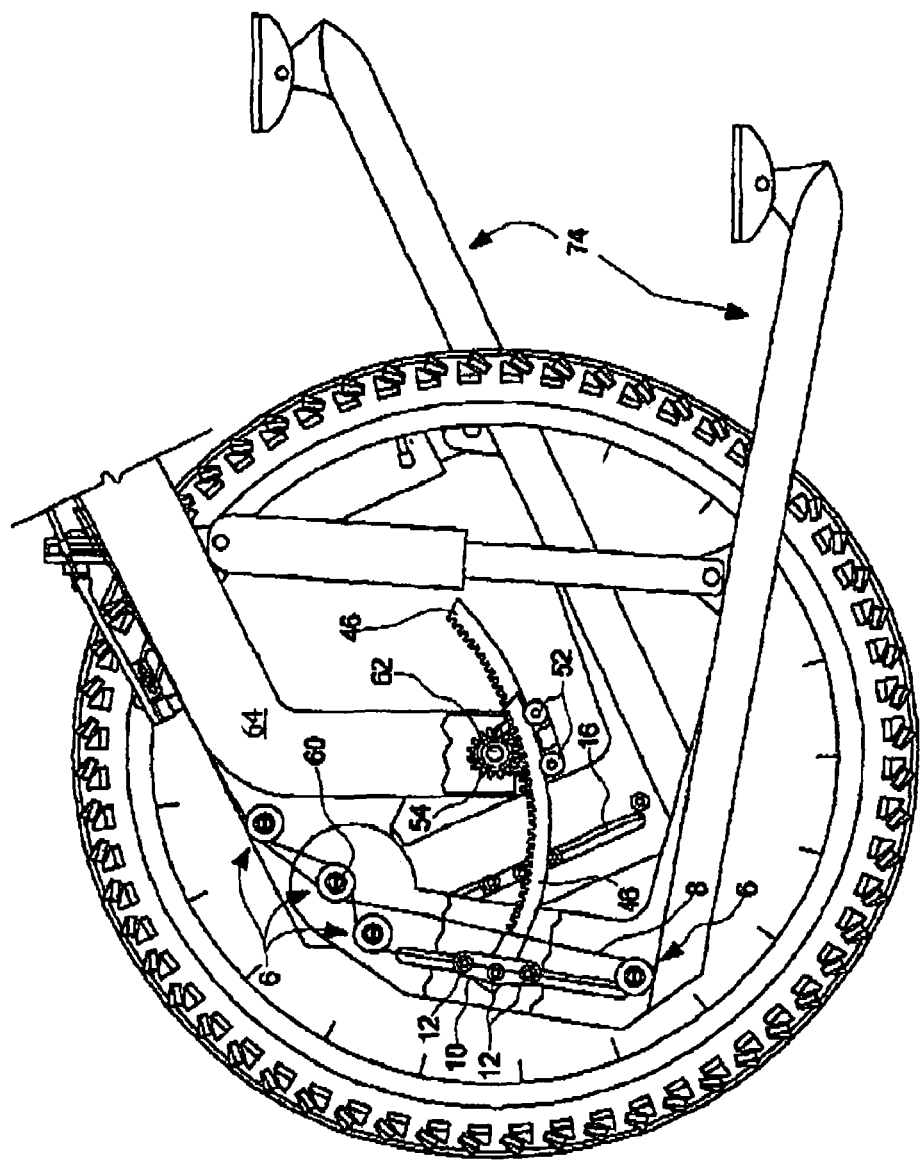
FIG. 4 shows an enlarged section of the multi-speed system with cut away sections.
Figure 5:
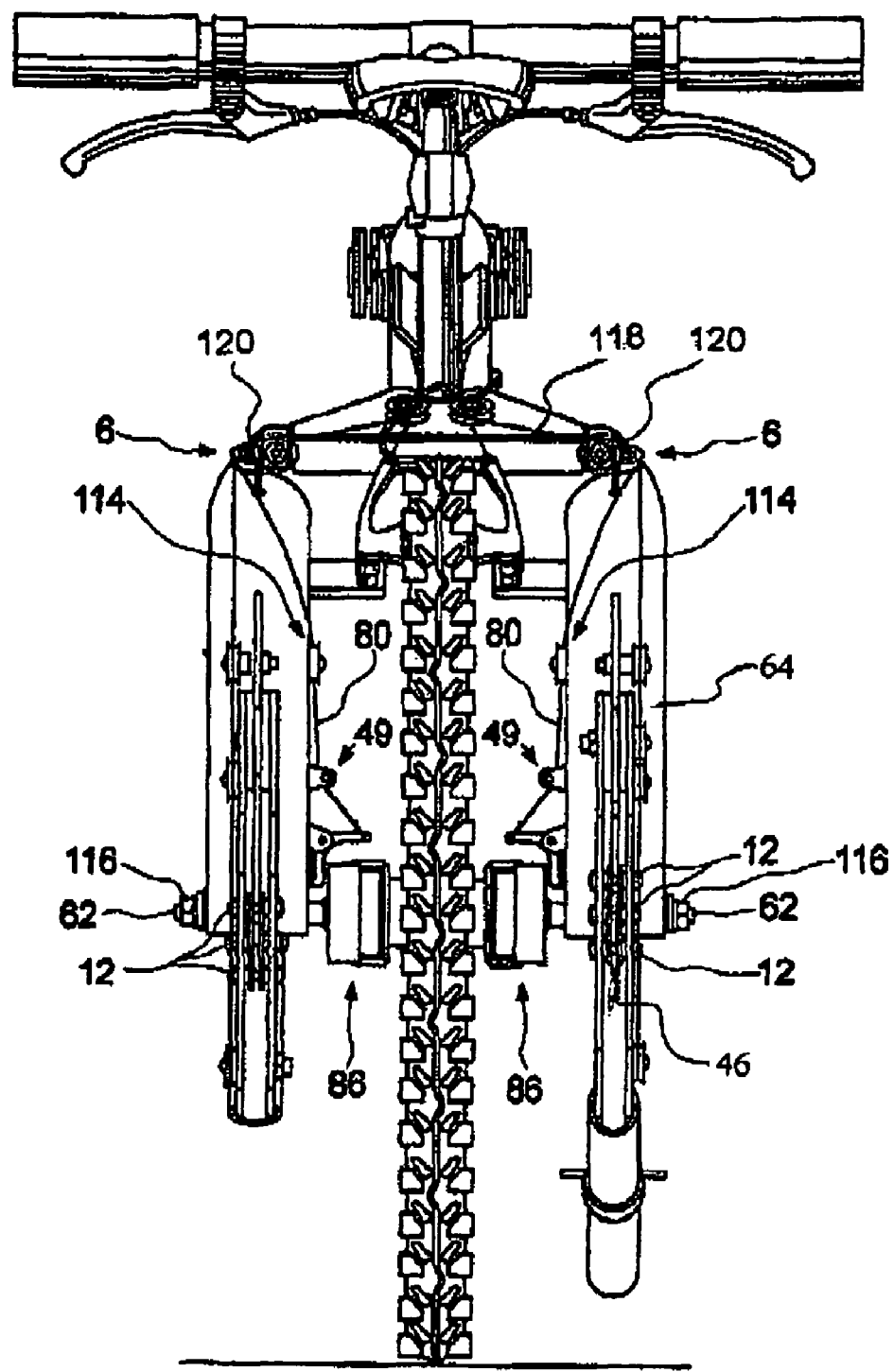
FIG. 5 shows the rear view of the LEPS with multi-speed system.
Figure 6:
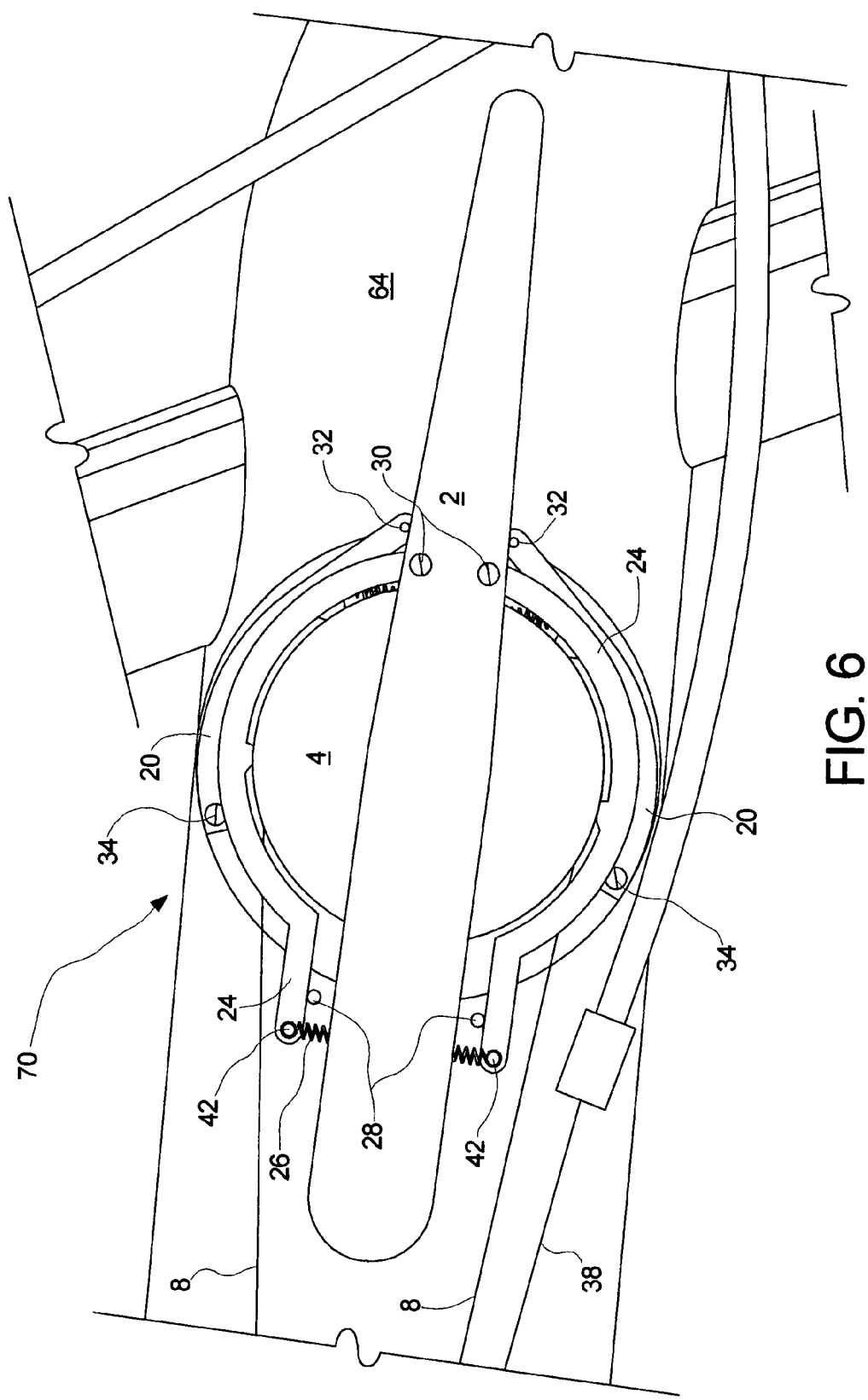
FIG. 6 shows an enlarged section of the multi-speed controls.

Each multi-speed cable 8 is connected to the respective carriage 10 mounted between the plates 104 of the respective lever machine 74. The carriage 10 is composed of a duplicate pair of steel plates, which have three aligned bores through them. Each bore is occupied by an axle. Each axle extends outwardly to the right and left of the plates to occupy the bore of a pulley wheel 12, thus totaling three pulley wheels 12 fixed on the right side of the plates and three pulley wheels 12 fixed on the left side of the plates. Between the plates is the end portion of the curved linear gear 46, which has a bore through its end occupied by the middle axle (FIG. 4). Each pair of outer pulley wheels on opposite sides of the plates are able to roll on the vertical groove 16 surfaces that face rearward. Each middle pulley wheel on opposite sides of the plates is able to roll on the vertical groove 16 surfaces that face frontward. Each pulley wheel 12 is fixed against the groove surfaces and the groove surfaces are held within their concave circumference, thus allowing the assembly to only travel rigidly up or down between the vertical plates of lever machine 74. The multi-speed cable 8 portion that is closest to the rear edge of the lever machine 74, is fastened at a point to the axles of the pulley wheels 12 positioned within the groove 16 of the lever plates 104 (FIG. 3). Thus, each carriage 10 has the ability to be moved at this point by the multi-speed control system 70.

Figure 15:
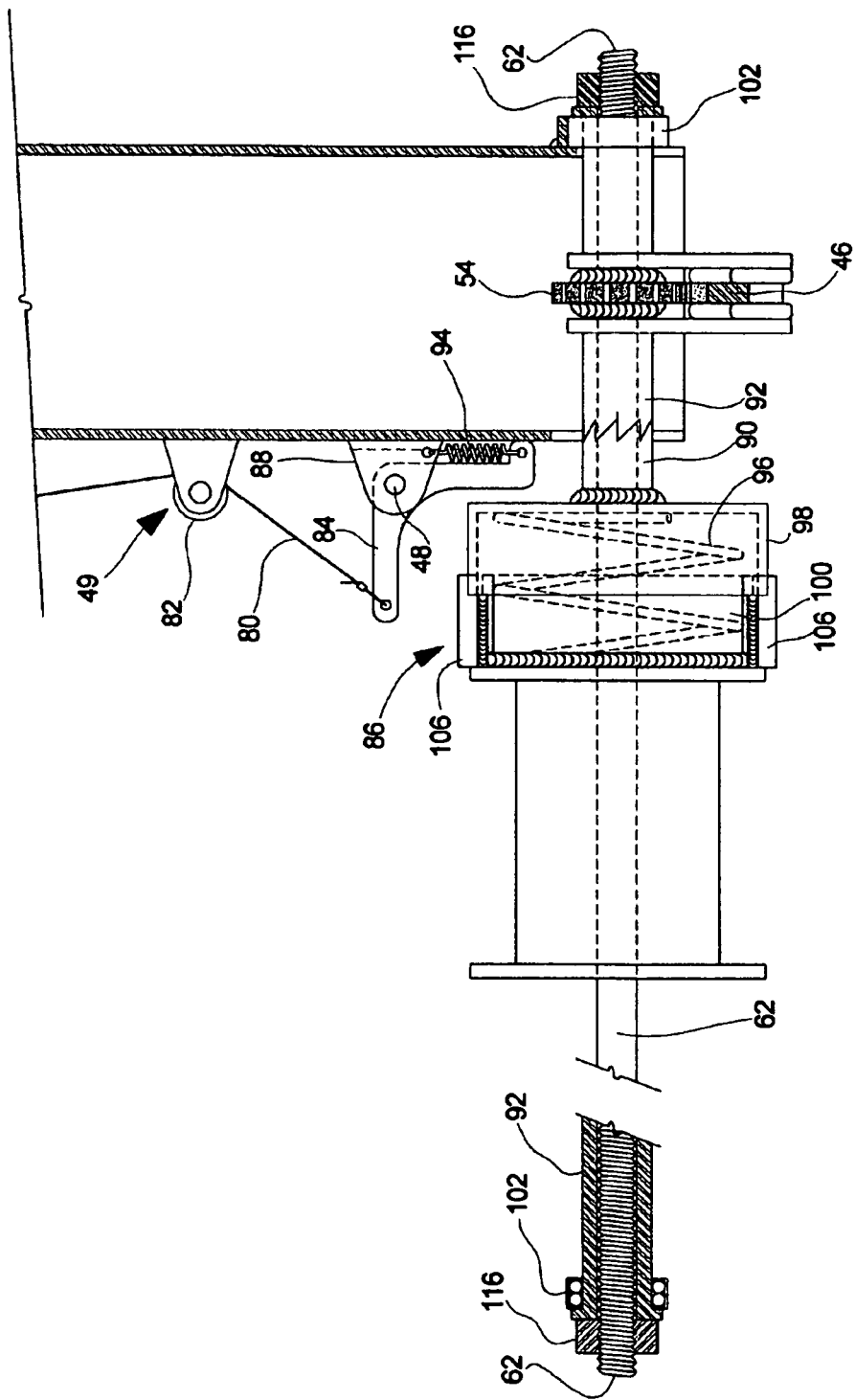
FIG. 15 shows an exposed section of the reverse mechanism connected to the extended hubs 86.

The two spur gears 54 (FIG. 4) centrally connected to opposite sides of the rear wheel's hub are bound to curved linear gears 46 by binding apparatuses 56. Each binding apparatus is composed of two hardened steel triangular plates 56 with rounded off corners. There is a bore through the center of each curve. Each bore accommodates an axle. The two lower axles fasten separate pulley wheels 52 between the steel triangular plates 56. The top bore is occupied by the stationary cylinder 92 and the cylinder is occupied by the main axle 62. The curved linear gear 46 is positioned between the spur gear 54 and the two lower pulley wheels 52. The teeth of the curved linear gear 46 are held up rigidly to mesh with the teeth of the spur gear 54. The axle 62 and spear spur gear 54 are separated between a cylinder 92 welded to the spur gear 54, while the axle 62 runs through the center of both spur gears on opposite sides of the wheel. The stationary cylinder 92 has the ability to rotate within a ring bearing 102, which is fastened to the outer frame 64 of the bike (FIG. 15). The bearing 102 decreases friction acquired from the rotation of the cylinder 92, as the spur gear 54 is rotated.

Figure 17:
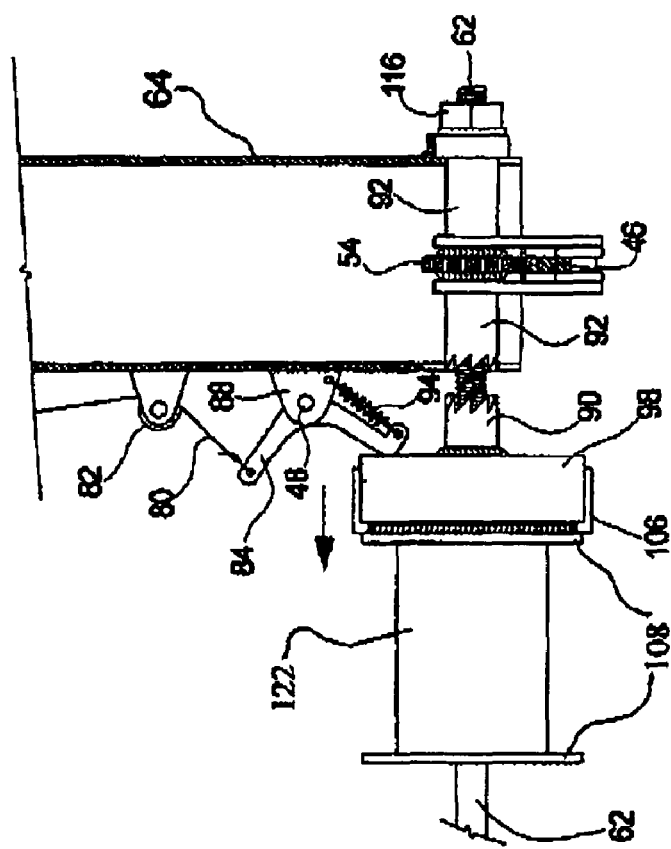

The rear portion of the bicycles frame is symmetrical (FIG. 5), wherein the center between each parallel plate 104 of a member lever machine 74 are aligned to the rear center of separate member tubes of the bicycle frame 64. Each lever machine 74 has pivotal connection to a trapezoid shaped plate that is attached to the rear vertical portion of the bicycles frame 64. Each linear transmission means 46 is aligned to a spur gear 54 that is within a vertical tube of the bicycle frame 64 (FIG. 15). As illustrated in FIGS. 4, 15 and 17 the spur gear is within the vertical rear tube of the bicycle frame 64.

The reverse system is composed of two cables 80 symmetrically fastened to a reverse lever 76 and a symmetrical array of pulley wheels 114. The reverse 76 lever is mounted to the wing shaped plates that hold the seat post cylinder 58 between them. The adjacent portions of the plates that are welded together have a bore through them which accommodates axle 78 functioning as the fulcrum of the reverse lever 76. The reverse lever 76 has two parallel linear beams with rounded ends that lead straight rearward with a slant upwards and then form another angle at 154 degrees to run parallel to the top edges to the winged plates. The rear edges of the parallel beams form a sharp angle pointing rearward. The upper portions of the parallel beams are welded to the bottom surface of the horizontal lever plate. The mid-portion of the horizontal lever plate has separate cables 80 fastened to it on opposite sides. Each cable 80 descends down to pulley wheel 114, which route each cable 80 towards the rear of the bike and down to right angle levers 84 (FIG. 15). Each of the right angle levers 84 is mounted to the inner surface of its vertical frame 64 portion, near extended hub assembly 86. Each cable 80 is mounted through a bore in the horizontal end of separate right angle levers 84. Each lever 84 is composed of a plate of steel formed into a 90 degree angle with rounded ends. The fulcrum 48 of each lever 84 is located through the corner surface of each right angle lever 84. The mounts for each lever are triangular units 88 that are formed triangularly with a groove between the rounded triangular corners stopping 1/8" from the base of each triangular unit 88. A bore is through the center curve of each triangular unit accommodating a fulcrum 48 or axle. The levers 84 are positioned so that their vertical ends are within contact distance of extended hub members 86. Duplicate extension spring 94 ends are attached next to the vertical end portions of each right angle lever 84. The opposite ends of each spring 94 are attached next to the bases of triangular units 88. These springs 94 keep tension on their levers 84 directing pulling tension vertically. Each right angle lever 84 attached to a reverse cable 80, has the ability to move its hub 98 inwardly (FIG. 17). Each outer hub 98 has the ability to slide inward around the main axle 62 toward the rear wheel. Each hub assembly 86 (FIG. 15) is an assembly of two cylinders. The cylinder 100, connected to the freestyle sprocket by a welding process, is formed to fit inside the inner walls of its associated cylinder 98 with a small gap of 1/32" between them. Two linear bars 106 of metal opposite from one another are welded to the outer surface of the inner cylinder 100. They are able to slide in a pair of grooves aligned in the walls of the outer cylinder 98. As a result, the larger outer cylinder 98 has the ability to slide around the smaller inner cylinder 100 horizontally, but it is prevented from rotating around the smaller cylinder 100. A compression spring 96 within each extended hub assembly 86 maintains outward pressure on each outer hub 98. Each spring 96 closely fits inside the walls of the smaller cylinder 100. The larger cylinder 98 is fitted around a smaller cylinder 90 0.875" in diameter, which closely fits around the main axle 62. The cylinder 90 has sharp edge teeth 3/8" in length pointing outwardly (FIG. 15). These teeth are formed to engage and lock into opposing teeth of similar length and shape, which are formed into the cylinder 92 connected to the spur gear 54 by welding process. When the larger cylinder 98 is engaged by its right angle lever 84 pushing it horizontally towards the rear wheel, the teeth of cylinder 90 disengage the teeth of cylinder 92 connected to the spur gear 54, which allows the rear wheel to rotate free of the spur gear 54 and its welded cylinder 92. This mechanism is part of the reverse system, which reacts in the manner described when the reverse lever 76 is lifted up.

Operation—FIGS. 9 to 14A

Figure 16:
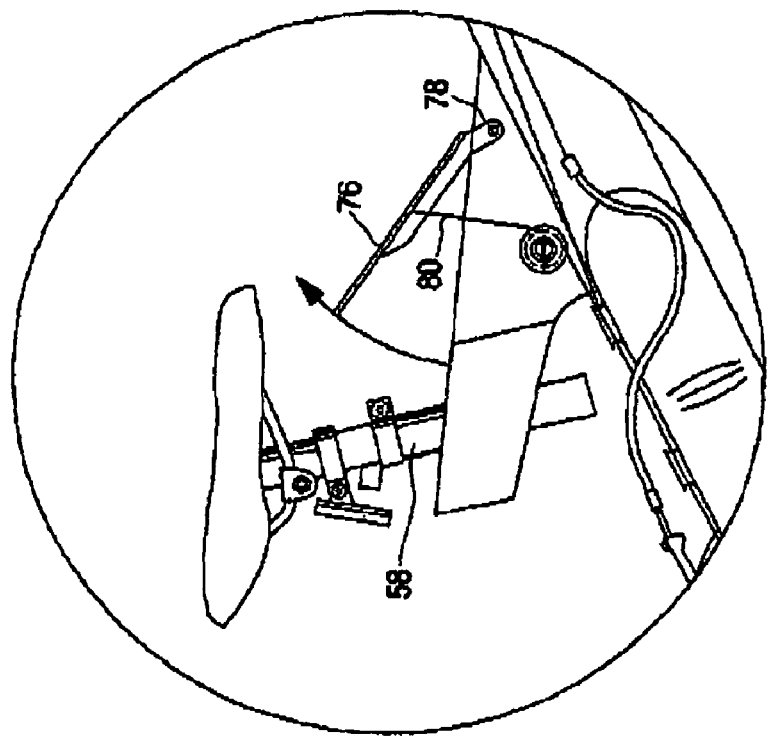
FIGS. 16 and 17 show the reverse lever 76 lifted and how the teeth of the movable cylinder 90 disengage the teeth of the stationary cylinder 92 to allow the rear wheel to rotate backwards free of the spur gear 54 assembly.

The manner of using the multi-speed system for the LEPS is illustrated in FIGS. 2, 4 and 9 to 14A. To operate the machine, the rider has to depress the pedal connected to either right or left lever machine 74. Once a force is applied to a pedal, these reactions would take place: The vertical portion 104 of the lever 74 upon which force is being applied will pull its connected linear transmission means 46 rearward, while the undersurface of a spur gear 54 coupled to said linear transmission means 46, causing it to rotate in a forward driving direction within the lower vertical tube portion of the bicycle frame 64. This rotation of the spur gear 54 would cause the cylinder 92 connected to it to rotate as well as a meshed cylinder 90 to turn with it. The meshed cylinder 90 is connected to a compression hub 98, which is connected to an outer hub 100, which is connected to a free style sprocket 108, which is connected to the hub 122 of the rear wheel, which causes the rear wheel to turn along with the coupled spur gear 54, thus moving the bicycle forward. While the initial lever machine 74 is being depressed, the adjacent lever machine 74 is being pulled up with reciprocal movement by a cable 118, which is through one side of the frame 64 (FIG. 5) over two pulley wheels 120 and through the other side of the frame 64, allowing the rider to push the latter elevated lever machine 74 downwards to pedal the bicycle forward again. While riding the bike having the LEPS, the rider can increase speed by pivoting the frontal portion of the multi-speed handle 2 downward. This causes the push angles 68 associated with the symmetrical outer curved arms 24 to push the outer sprockets 110 clockwise (FIG. 10) when viewed from the right side. This movement causes each multi-speed cable 8 connected to the axles of the pulley wheels 12 within the groove 16 of its lever machine 74 to be moved downwards and away from its fulcrum 60 (FIG. 16). Thus, the carriage 10 on which the pulley wheels 12 are mounted, is pulled away from the fulcrum 60, which pushes down the curved linear gear 46 it is fastened to. This move away from the fulcrum 60 increases the circumference of the curved gear's 46 swing. As a result, the pull on the under side of the spur gear 54 is multiplied, increasing wheel rotation per pedal. When trying to decrease pedaling effort the rider would only need to pivot the multi-speed lever 2 upward to cause the carriages 10 to simultaneously move upward towards their fulcrums 60. The reverse mechanism of the LEPS with multi-speed system is unique in that its linear transmission 46 link must be separated from the rear wheel in order to move the bike backwards. In order to move the bike backwards the operator should lift up the reverse lever 76 located in front of and below the seat. While this lever is up the operator should proceed to move the bike in reverse.

I claim:

1. A lever propelled bicycle with a tubular symmetrical frame, wherein the lever propelled bicycle comprises:

A lever propelled bicycle with a tubular symmetrical frame, the bicycle comprising:

right and left lever machines, wherein each of the lever machines is "L" shaped and has a shorter side in a generally vertical position and a longer side in a generally horizontal position when the lever machine is at a lowest rotated position and wherein each of said lever machines has a fulcrum near an upper end of the shorter side;

a first linear transmission means connected to the shorter side of the right lever machine and a second linear transmission means connected to the shorter side of the left lever machine;

said first linear transmission means operable to pull with rotational force a connected rotational drive component within a respective right upright tube member of said bicycle to rotate a coupled rear wheel in a forward driving direction and said second linear transmission means operable to pull with rotational force a second connected rotational drive component within a respective left upright tube member of said bicycle to rotate the coupled rear wheel in a forward driving direction.

* * * * *